March 3, 1970 CARL-HEINZ JESKE 3,499,116
CIRCUIT ARRANGEMENTS FOR REMOTELY CONTROLLED DICTATING INSTALLATIONS HAVING MULTIPLE SUBSCRIBER AND DICTATING MACHINE STATIONS TO PREVENT ENGAGEMENT OF A PREVIOUSLY ENGAGED DICTATING MACHINE STATION
Filed June 25, 1964
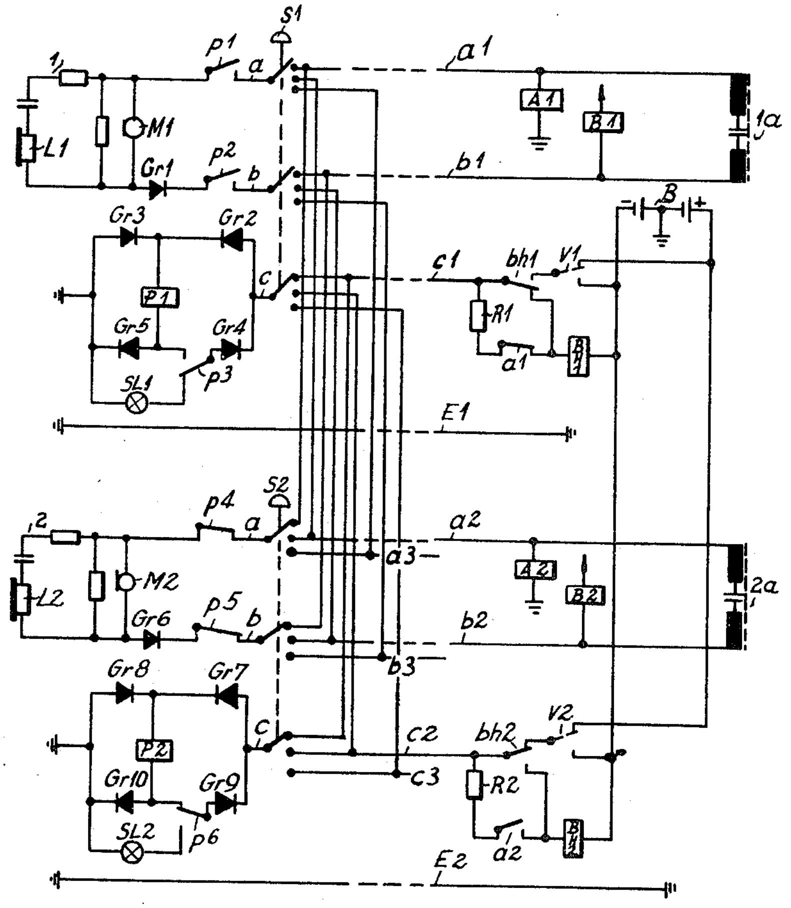
INVENTOR
Carl-Heinz Jeske
BY
Wolf, Greenfield, Hieken & Sacks United States Patent Office 3,499,116

Patented Mar. 3, 1970

3,499,116

CIRCUIT ARRANGEMENTS FOR REMOTELY CONTROLLED DICTATING INSTALLATIONS HAVING MULTIPLE SUBSCRIBER AND DICTATING MACHINE STATIONS TO PREVENT ENGAGEMENT OF A PREVIOUSLY ENGAGED DICTATING MACHINE STATION

Carl-Heinz Jeske, 36 Kurnbergstrasse, Munich, Germany

Filed June 25, 1964, Ser. No. 377,801
Claims priority, application Germany, June 27, 1963, S 85,878
Int. Cl. H04m 11/10
U.S. Cl. 179—6 4 Claims

ABSTRACT OF THE DISCLOSURE

A remotely controlled dictating machine installation has a number of subscriber stations that may select any one of a number of remote dictating machine stations except one that has been previously engaged by another subscriber station. There is a common positive and negative potential source. Each dictating machine station includes a holding relay that provides a positive potential to the third pole of a selecting switch at a subscriber station that has selected that particular dictating machine station when the dictating machine is free and a negative potential when the dictating machine station is busy. Each subscriber station includes a dictating machine station selection switch having at least two poles for exchanging audio signals with the selected dictating machine station and the third pole for receiving information on whether the selected dictating machine station is busy or free Each subscriber station also includes a connection relay having its winding connected across opposed junctions of a bridge rectifier circuit whose other opposed junctions are connected between ground and the third pole so that the connection relay winding is energized only when the third pole bears a positive potential to then connect subscriber station transducing means to the two poles of the selection switch that exchange audio signals with a dictating machine station. The connection relay means also includes contacts for connecting one of the rectifiers in series with the third pole and indicating means connected to ground to provide an indication that the selected dictating machine station is busy.

The invention relates to circuit arrangements for remotely controlled dictating installations.

In connection with the switching through of connections in telephonic and remotely controllable dictating installations it is necessary before switching through the speech wires to test whether the selected line path is available or is already engaged by another subscriber.

This testing is normally effected on a separate test wire which, in the unengaged that is to say free condition, supplies such a potential to a testing relay that it responds and can thereby initiate or carry out the switching through procedure of the line connection, and in the engaged condition supplies to the relay a potential which is not sufficient for it to operate, so that it is not energised, whereby the switching through of the line connection is prevented.

It is known to provide these test criteria "free" or "engaged" of the testing relay by potential magnitude difference or by potential reversal.

In this connection, the requirement arises that the test relay, after it has responded due to the available "free" potential, should be able to perform the switching over of test potential (free potential) to engaged potential, without lapsing from its operative position during the potential changeover, in order that on the one hand the established line connection is maintained and on the other hand a further relay testing the same line receives engaged potential and thus for its part cannot respond, so that so called double engagement is avoided.

It is known to meet this requirement by providing the test relay with a plurality of separate energising windings, but which amount to at least two, in order not to lapse after for example low ohmic testing and also in connection with the provision of high ohmic holding and blocking potential. The case of so called potential reversal is similar, this circuit variation supply to the testing relay the necessary potential for operation, in the free condition, the polarity of the test wire subsequently reversing, but the testing relay nevertheless being held in its operative condition through the second energising winding.

The relays required in this case, as a result of the various separate windings which are necessary, are more expensive than relays with one winding only.

It is an object of the present invention to provide a circuit arrangement for a remotely controllable dictating installation, in which the testing relay has a single winding.

It is a further object of the invention to provide a circuit arrangement for a remotely controllable dictating installation in which a direct current relay with a single energising winding is provided as the test member, a rectifier arrangement and a relay contact being allocated to it in such manner that it responds by an "unengaged" potential which for example is positive relative to earth, and after switching through of the speech wires is effected, remains in the operative position with an "engaged" potential which is negative relative to earth. When testing with an "engaged" potential which is negative relative to earth the relay does not respond and the available "engaged" potential can for example be used to signal the engaged condition of the line connection being tested, to the second subscriber dialling.

The above and other objects and advantages of the invention will be made clear in the following description given with reference to the accompanying drawing, which is given by way of example and which is a circuit diagram of a remotely controllable dictating installation.

The drawing shows the testing and speech line paths of two dictating stations (subscriber 1 and subscriber 2), to three dictating devices, device 1*a* and device 2*a* being shown and only the lines $a_3$, $b_3$, $c_3$ to device 3 being illustrated, each subscriber being able to select a desired dictating device by means of a selector switch S1 or S2 respectively, provided in his subscriber's station.

For explaining the electrical procedures which take place or arise in this connection, the drawing is set out on the assumption that the subscriber's station 1 is free, subscriber's station 2 has engaged dictating device 1*a*, and the dictating devices 2*a*, 3 are free, that is to say can also be selected.

If subscriber 1*a* now switches on to the device 1 engaged by subscriber 2, by means of his selector switch S1, then the test circuit to subscriber's station 1 is offered a potential which is negative relative to earth, through the test wire *c*1, whereupon a signal lamp SL1 illuminates, the current path being as follows:

—, BH1, *bh*1, *c*1, S1(*c*), G*r*4, *p*3, SL1, +Earth (B earthed)

The test relay P1 cannot now respond, since the rectifier G*r*2 blocks the current path to the relay against the negative potential lying on the wire *c*1.

Subscriber 1 now switches his selector switch S1 onto the lines of device 2*a*. The test relay P1 receives positive free potential from device 2*a*, the current circuit being:

+, *bh*2, (*v*2), S1(*c*), G*r*2, P1, G*r*5, Earth (B earthed)

Relay P1 responds and places its contacts P1, P2 and P3 in the operative position. As a result of the speech loop which is thereby switched through, the relays A2 and B2 in the dictating device are energised, the current path being:

—, B2, *b*2, S1(*b*), *p*2, G*r*1, M1, *p*1, S1(*a*), *a*2, A2, +(B earthed)

With changing over of the relay A2, its contact *a*2 is connected to relay BH2, the current path being:

—, BH2, *bh*2, *c*2, S1(*c*), G*r*4, *p*3, P1, G*r*3, +(B earthed)

After the speech wires 1, *b*1 or *a*2, *b*2 have been connected through from the device to the subscriber, the subscriber has the possibility by means of switches which are not shown, to connect the *a* and *b* wires separately and respectively to a potential or to earth and by means of the relays A and B and further relays which are not illustrated, supply operating commands to the selected dictating device through the speech wires.

I claim:

1. A multiple dictating machine installation providing access to any free dictating machine station by any of a plurality of dictating subscriber stations while preventing a subscriber station from engaging an engaged dictating machine station comprising, a plurality of dictating machine stations, a plurality of subscriber stations, means defining a common terminal maintained at reference potential, a common source of a positive potential relative to said reference potential, a common source of a negative potential relative to said reference potential, each of said subscriber stations including a multiple-pole multiple-throw switch for selectively coupling the associated subscriber station to any of said plurality of dictating machine stations, said multiple-pole multiple-throw switch including as many throw positions as there are dictating machine stations and at least a first pole and a second pole for exchanging voice signals with the selected dictating machine and a third pole for carrying a signal related to the state of engagement of the selected dictating machine station, each of said dictating machine stations including holding relay means for coupling one and the other of said positive and negative potentials to denote the dictating machine station then being busy and free respectively when selected by one of said multiple-pole multiple-throw switches, each of said subscriber stations including connection relay means for selectively coupling associated subscriber transducing means to said first and second poles and unilaterally conducting means in series with said third pole for selectively energizing said connection relay means only in response to one of said positive and negative potentials so that said relay means may couple the associated subscriber transducing means to said first and second poles only when said other potential is present on said third pole while preventing such coupling when said one potential is present on said third pole.

2. A multiple dictating machine installation in accordance with claim 1 wherein said unilaterally conducting means comprise means defining a bridge rectifier arrangement having a first junction connected to said third pole, a second junction opposite said first junction connected to said reference terminal and a winding associated with said connection relay means connected between a third junction and a fourth junction opposite said third junction.

3. A multiple dictating machine installation in accordance with claim 2 and further comprising indicating means connected to said reference terminal, and means associated with said connection relay means for selectively connecting a unilaterally conducting device of said bridge rectifier arrangement to said third junction when said other potential is present on said third pole to couple the associated transducer means to the selected dictating machine station and to said indicating means when said one potential is present on said third pole to provide an indication that the then selected dictating machine station is then engaged by another subscriber station.

4. A multiple dictating machine installation in accordance with claim 1 and further comprising, indicating means, and means associated with said connection relay means for selectively coupling said indicating means to said third pole only when said one potential is then present on said third pole to provide an indication that the then selected dictating machine station is then engaged by another subscriber station.

References Cited

UNITED STATES PATENTS 2,833,865 5/1958 Kutik ............ 179—100.1

OTHER REFERENCES

Boggs, R. P., IBM Technical Disclosure Bulletin, vol. 7, No. 10, March 1965, pp. 871, 872 (179–100.1 DR).

RALPH D. BLAKESLEE, Primary Examiner

U.S. Cl. X.R.

179—18